(12) United States Patent
Wedig et al.

(10) Patent No.: US 12,282,346 B2
(45) Date of Patent: Apr. 22, 2025

(54) SYSTEMS AND METHODS FOR SMART TEMPERATURE CONTROL DEVICES

(71) Applicant: OneEvent Technologies, Inc., Mount Horeb, WI (US)

(72) Inventors: Kurt Joseph Wedig, Mount Horeb, WI (US); Daniel Ralph Parent, Mount Horeb, WI (US); Brett Bodenburg, Mount Horeb, WI (US); Nathan Gabriel, Fitchburg, WI (US)

(73) Assignee: OneEvent Technologies, Inc., Mount Horeb, WI (US)

( * ) Notice: Subject to any disclaimer, the term of this patent is extended or adjusted under 35 U.S.C. 154(b) by 0 days.

(21) Appl. No.: 18/636,931

(22) Filed: Apr. 16, 2024

(65) Prior Publication Data

US 2024/0272658 A1 Aug. 15, 2024

Related U.S. Application Data

(62) Division of application No. 17/220,748, filed on Apr. 1, 2021, now Pat. No. 11,989,042.

(60) Provisional application No. 63/004,687, filed on Apr. 3, 2020.

(51) Int. Cl.
  *F25D 29/00* (2006.01)
  *G05D 23/19* (2006.01)

(52) U.S. Cl.
  CPC ......... *G05D 23/1904* (2013.01); *F25D 29/00* (2013.01); *G05D 23/1928* (2013.01); *F25D 2700/123* (2013.01)

(58) Field of Classification Search
  CPC ............ G05D 23/1904; G05D 23/1928; F25D 2700/123; F25D 29/00
  See application file for complete search history.

(56) References Cited

U.S. PATENT DOCUMENTS

| | | | |
|---|---|---|---|
| 6,745,581 B2 * | 6/2004 | King | G07F 13/065 236/47 |
| 7,765,831 B2 * | 8/2010 | Rodriguez | F25D 29/003 62/210 |
| 9,427,097 B2 * | 8/2016 | Choueifati | A47F 3/0408 |
| 10,041,713 B1 * | 8/2018 | Zugibe | F24F 11/62 |
| 10,055,699 B2 * | 8/2018 | Brown | G06Q 10/06 |
| 11,280,536 B2 * | 3/2022 | Barrios | F25D 29/005 |
| 2015/0025693 A1 * | 1/2015 | Wu | F24F 11/30 700/278 |
| 2019/0285304 A1 * | 9/2019 | Felber | G01K 13/00 |

* cited by examiner

*Primary Examiner* — Filip Zec
(74) *Attorney, Agent, or Firm* — Kenneth A. Smith

(57) ABSTRACT

A smart temperature control system is disclosed. The smart temperature control system includes processing circuitry and a temperature control device. The temperature control device includes a container configured to store a product and temperature control hardware configured to control a temperature within the container. The processing circuitry includes one or more processors configured to monitor the temperature cycles within the container, determine a duration of at least portions of each temperature cycle over a time period, determine a selected time value based on the duration of the portions of each temperature cycle, and update a time limit variable with the selected time value.

5 Claims, 7 Drawing Sheets

SYSTEMS AND METHODS FOR SMART TEMPERATURE CONTROL DEVICES

CROSS REFERENCE TO RELATED APPLICATIONS

This application is a division of U.S. Nonprovisional application Ser. No. 17/220,748, filed on Apr. 1, 2021, which claims priority to U.S. Provisional application No. 63/004,687, filed on Apr. 3, 2020 which is incorporated herein by reference in its entirety.

FIELD OF THE DISCLOSURE

The present disclosure relates generally to temperature control devices. More particularly, the present disclosure relates to systems and methods for smart temperature control devices.

BACKGROUND

The present disclosure relates generally to temperature control devices. Temperature control devices may include one or more containers and be configured to control the temperature within the containers within a specified range. For example, a temperature control device may include a cooler for keeping food, drink, and product cool.

SUMMARY

The subject matter of this disclosure is directed to systems and methods for smart temperature control systems. In exemplary embodiments, a smart temperature control system is configured to monitor the temperature within a container which may hold products to be kept within a particular range of temperatures. In exemplary embodiments, the smart temperature control system utilizes historical data of the temperature (e.g., temperature cycles) of the container in order to set and/or update one or more setpoints that can be used to determine when the smart temperature control device is having a failure or abnormality. In certain exemplary embodiments, the updated parameters that are based on historical data of the particular smart temperature control device also reduce the amount of false alarms, which ensures that the alarms or notifications of abnormalities of failures are taken seriously.

One implementation of the present disclosure is related to a smart temperature control system, according to some embodiments. In certain exemplary embodiments, the smart temperature control system includes temperature control hardware configured to control a temperature within a container, and one or more processors coupled to a non-transitory computer-readable storage medium having instructions encoded thereon that, when executed by the one or more processors, cause the one or more processors to determine an operating parameter of a temperature control device based on historical data of an operating variable, monitor a current operating variable of the temperature, and transmit a notification in response to detecting an abnormal event based on the current operating variable and the operating parameter.

In some exemplary embodiments, the temperature control hardware comprises one or more temperature sensors communicably coupled to the one or more processors and positioned to sense a temperature within the container. In some exemplary embodiments, an operating parameter comprises an upper time limit variable, the historical data of the operating variable comprises historical data of the temperature, and the current operating variable comprises a current temperature within the container. In some exemplary embodiments, to determine the operating parameter, the non-transitory computer-readable storage medium further comprises instructions encoded in the non-transitory computer-readable storage medium that, when executed by the one or more processors, cause the one or more processors to access the historical data of the temperature, determine a duration of a peak temperature cycle within the historical data of the temperature, determine a selected time value based on the duration of the peak temperature cycle, and update an upper time limit variable with the selected time value. In some exemplary embodiments, an abnormal event comprises a peak temperature cycle lasting longer than the upper time limit value. In some exemplary embodiments, the peak temperature cycle comprises the temperature within the container being greater than an upper temperature limit for a period of time without dropping below the upper temperature limit.

In some exemplary embodiments, a system further includes a memory communicably coupled to the one or more processors, the memory being configured to store the time limit variable, an upper temperature limit, a lower temperature limit, historical data of the temperature within the container, a maximum bound of the upper time limit, a maximum bound of the lower time limit, and an indication of time buffers based on the sample size.

In another exemplary embodiment, the systems and methods disclosed herein are directed to control and monitoring of a refrigeration unit. In certain exemplary embodiments, the refrigeration unit comprises a container, temperature control hardware configured to control a temperature within the container, and one or more processors configured to determine an operating parameters of a temperature control device based on historical data of an operating variable, monitor a current operating variable of the temperature control device, and transmit a notification in response to detecting an abnormal event based on the current operating variable and the operating parameter.

In some exemplary embodiments, the operating parameter comprises an upper time limit, the historical data of the operating variable itself comprising historical data of the temperature, and the current operating variable comprising the current temperature within the container. In some exemplary embodiments, an abnormal event comprises a peak temperature cycle lasting longer than the upper time limit. In some exemplary embodiments, the operating parameter comprises a lower time limit, the historical data of the operating variable comprising historical data of the temperature, and the current operating variable comprising the current temperature within the container. In some exemplary embodiments, the abnormal event comprises a valley temperature cycle lasting longer than the lower time limit. In some exemplary embodiments, to transmit the notification, the one or more processors are further configured to either cause an alarm to turn on or to transmit a notification to a personal device of a user. In some exemplary embodiments, the one or more processors are further configured to store historical data of the temperature within the container in a memory.

In other exemplary embodiments, the systems and methods disclosed herein are directed to a method of operating a temperature control device. The method includes determining, via processing circuitry of the temperature control system, an operating parameter of a temperature control device based on historical data of an operating variable, monitoring, via the processing circuitry, a current operating variable of the temperature control system, and transmitting, via the processing circuitry, a notification in response to detecting an abnormal event based on the current operating variable and the operating parameters.

In some exemplary embodiments, historical data of the operating variable comprises a temperature within a container at particular times over a first period of time, wherein the historical data of the operating variable indicates one or more peak temperature cycles, wherein each peak temperature cycle comprises a first time and a second time, and wherein the first time comprises a time period during which temperature of the control device exceeds an upper temperature limit and the second time comprises a time period during which the temperature of the control device falls below the upper temperature limit. In some exemplary embodiments, the operating parameter comprises an upper time limit variable that indicates a maximum amount of time that the temperature of the container may exceed an upper temperature limit before the processing circuitry notifies a user. In some exemplary embodiments, the upper time limit variable is a maximum amount of time that the temperature of the container may exceed an upper temperature limit before the abnormal event is detected. In some exemplary embodiments, the upper time limit variable is determined based on historical data of the operating variable.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component is labeled in every drawing. In the drawings.

DETAILED DESCRIPTION

Figure 1:
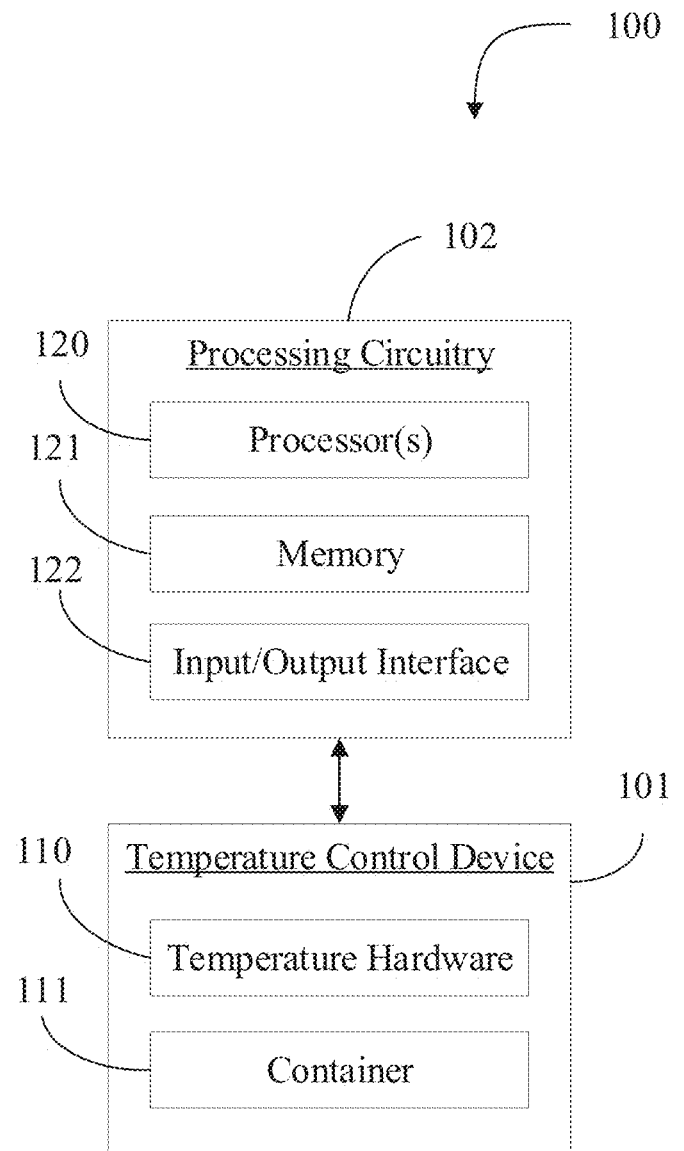
FIG. 1 is a block diagram of a smart temperature control device in accordance with an illustrative embodiment.

Referring generally to the FIGURES, systems and methods for a smart temperature control device are shown, according to some exemplary embodiments. Exemplary embodiments of a smart temperature control system comprise processing circuitry configured to be connected to a temperature control device. The processing circuitry includes at least one processor, a memory, and an input/output interface. In some exemplary embodiments, the temperature control device includes an insulated container and/or various temperature control hardware. In some exemplary embodiments, the temperature control device is adapted to an existing container and/or various temperature control hardware. In some exemplary embodiments, the temperature control hardware includes compressors, chillers, evaporators, temperature sensors, humidity sensors, or a combination thereof. The temperature within the container may fluctuate over time between a first and second temperature, these fluctuations may be known as temperature cycles. The temperature cycles may be due to normal operating conditions, defrost cycles, a door being left open, and other circumstances that would be understood by one of ordinary skill in the art to result in temperature variations.

In an exemplary embodiment, a processor is communicably connected to various temperature control hardware components, collects data from at least some of the temperature hardware components, and performs various temperature cycle learning operations. The temperature cycle learning operations may then be used to set or update one or more parameters that may be used to monitor the temperature within the container and determine whether an abnormality or error is occurring. That is, the smart temperature control device may monitor the temperature cycles of a container over a period of time and determine based on the monitored temperature cycles (e.g., historical operation data) what is considered to be normal. In certain exemplary embodiments, the smart temperature control device may then trigger alarms or warnings if the container begins to operate outside of an expected temperature range.

For example, each temperature control device (e.g., a refrigerator or a freezer) may have different temperature cycles (e.g., peak or valley temperatures at particular times) based on the size, application, amount of product being stored, or type of product being stored. Thus, the temperature control device may monitor the temperature cycles of a particular container, determine one or more operating parameters (e.g., conditions) for the particular container based on the temperature cycles, and trigger warnings if the operation of the particular container deviates from the desired operating parameter setpoint. In some exemplary embodiments, the temperature cycle learning operations (e.g., determining the operating parameter) may be performed at discrete time periods (or continuously) in order to ensure that the temperature control device is operation as expected or normally for the particular application. In other exemplary embodiments, the temperature cycle learning operations (e.g., determining the operating parameter) may be performed continuously in order to ensure that the temperature control device is operation as expected or normally for the particular application.

In one exemplary embodiment, the temperature learning operations may determine an upper time limit (e.g., a first parameter) and lower time limit (e.g., a second parameter) that indicate a maximum of time that the temperature control device may operate outside of a range of temperatures before a notification will be triggered or transmitted to warn an operator. In this way, the smart temperature control device can learn, analyze, and determine (e.g., utilizing historical data of the operating conditions) operating cycles and temperature ranges of particular temperature control devices that may have different operating requirements, cycles, or loads based on the size of the container, particular use of the container, amount of material in the container, and/or type of material in the container. For example, a smart temperature control system may include or be implemented with a refrigeration unit for commercial food storage that may have different tolerances, ranges of operating temperatures, and/or cycles than a temperature control device that includes a refrigeration unit intended for pharmacy purposes. The systems and methods described herein ensure that accurate operating parameters (e.g., time limits) that are used to monitor a particular temperature control device are determined and updated to ensure that products stored in the particular temperature control device are safely stored without falsely alarming operators.

In some exemplary embodiments, a temperature control device may be implemented in various form factors. For example, the temperature control device may be implemented as a refrigeration unit, an insulated cooler, freezer, pharmacy cooler, pharmacy freezer, or any other type of refrigeration or heating unit that must regulate the temperature of products being stored. In some exemplary embodiments, the smart temperature control system or methods may be implemented with existing containers, temperature control devices, or other devices that are designed to regulate the temperature of products being stored.

Referring now to FIG. 1, a block diagram of a smart temperature control system 100 according to an exemplary embodiment is shown. The smart temperature control system 100 includes processing circuitry 102 connected to or configured to be connected to a temperature control device 101. In some exemplary embodiments, the temperature control device 101 may be an existing installed temperature control device or a new temperature control device 101 furnished by a manufacturer of the smart temperature control system. The temperature control device 101 includes temperature control hardware 110 and a container 111. In some exemplary embodiments, the temperature control device 101 may include more than one containers 111.

In exemplary embodiments, the container 111 may be an insulated, enclosed, and openable unit that is configured to hold and store various products or materials. In some exemplary embodiments, the container 111 may be various sizes, include various shelving, include one or more openable doors, etc. In some exemplary embodiments, the container 111 may have one or more compartments, each designed to maintain an internal temperature within a range. In some exemplary embodiments, the various products or materials may include pharmacy products, food, drink, temperature sensitive chemicals, or other products.

In exemplary embodiments, the temperature control hardware 110 may include one or more temperature sensors, humidity sensors, other sensors, compressors, evaporators, chillers, heating devices, actuating vents, or other devices for controlling the climate within the container 111. In certain exemplary embodiments, the one or more temperature sensors are positioned to detect or measure a temperature within the container 111. In exemplary embodiments, the compressors, evaporators, chillers, heating devices, actuating vents, or other devices for controlling the climate within the container may be positioned internally, externally, or partially internally within the container 111 and are designed to control the climate (e.g., temperature, humidity, etc.) within the container 111. In an exemplary embodiment, at least some of the temperature control hardware 110 is connected to the processing circuitry 102. In some exemplary embodiments, one or more of the temperature control hardware components 110 may include local micro-processors, application specific integrated circuits, processors, or other control hardware. It is to be appreciated that the particular components chosen for the temperature control hardware 110 may depend on the particular application and design of the temperature control device 101.

In an exemplary embodiment, the processing circuitry 102 may include a processor 120, a memory 121, and an input/output interface 122. In some exemplary embodiments the processing circuitry 102 may be integrated with various electronic devices. For example, in some embodiments, the processing circuitry 102 may be integrated with a server system, a personal computer, or other computational devices associated with a manufacturer of the temperature control device 101 or a user of the temperature control device 110. In some exemplary embodiments, the processing circuitry 102 may also include one or more processors, application specific integrated circuit (ASICs), or circuitry (e.g., alarm circuitry) that are integrated with the temperature control device 101 and are designed to cause or assist the smart temperature control system 100 in performing any of the steps, operations, processes, or methods described herein.

In exemplary embodiments the processing circuitry 102 may include one or more circuits, processors 120, and/or hardware components. The processing circuitry 102 may implement any logic, functions or instructions to perform any of the operations described herein. The processing circuitry 102 can include memory 121 of any type and form that is configured to store executable instructions that are executable by any of the circuits, processors or hardware components. The executable instructions may be of any type including applications, programs, services, tasks, scripts, libraries, processes, and/or firmware. In some exemplary embodiments, the memory 121 may include a non-transitory computable readable medium that is coupled to the processor 120 and stores one or more executable instructions that are configured to cause, when executed by the processor 120, the processor 120 to perform or implement any of the steps, operations, processes, or methods described herein. In some exemplary embodiments, the memory 121 is configured to also store, within a database, parameters or variables, information regarding the type, form, or characteristics of the food, or material that the temperature control device 101 is storing or designed to store. In certain exemplary embodiments, the processing circuitry 102 can include converters, signal processing circuits, filters, and other interface elements in the analog domain and/or the digital domain.

In some exemplary embodiments, input/output interface 122 of the processing circuitry 102 is configured to allow the processing circuitry 102 to communicate with the temperature control device 101 and other devices. In some exemplary embodiments, the input/output interface 122 is be configured to allow for a physical connection (e.g., wired or other physical electrical connection) between the processing circuitry 102 and the temperature control device 101. In some exemplary embodiments, the input/output interface 122 includes a wireless interface that is configured to allow wireless communication between the temperature control device 101 (e.g., an ASIC, integrated circuit (IC), or processor on the temperature control device 101 connected to various components of the temperature control hardware 110) and the processing circuitry 102. The wireless communication may include a Bluetooth, wireless local area network (WLAN) connection, radio frequency identification (RFID) connection, or other types of wireless connections. In some exemplary embodiments, the input/output interface 122 also allows the processing circuitry 102 to connect to the internet (e.g., either via a wired or wireless connection). In some exemplary embodiments, the input/output interface 122 also allows the processing circuitry 102 to connect (e.g., transmit notifications) to other devices such as a display, audio system, alarm systems, personal devices, or other devices.

It should be noted that various other components can be included in the smart temperature control system 100 that are not shown for sake of clarity of the present embodiments. These can include various power and/or signal conditioning components such as analog to digital converters, multiplexers, transistors, etc. Such additional components can be included in either the temperature control device 101 or the processing circuitry 102 as appropriate for the particular embodiment.

Figure 2:
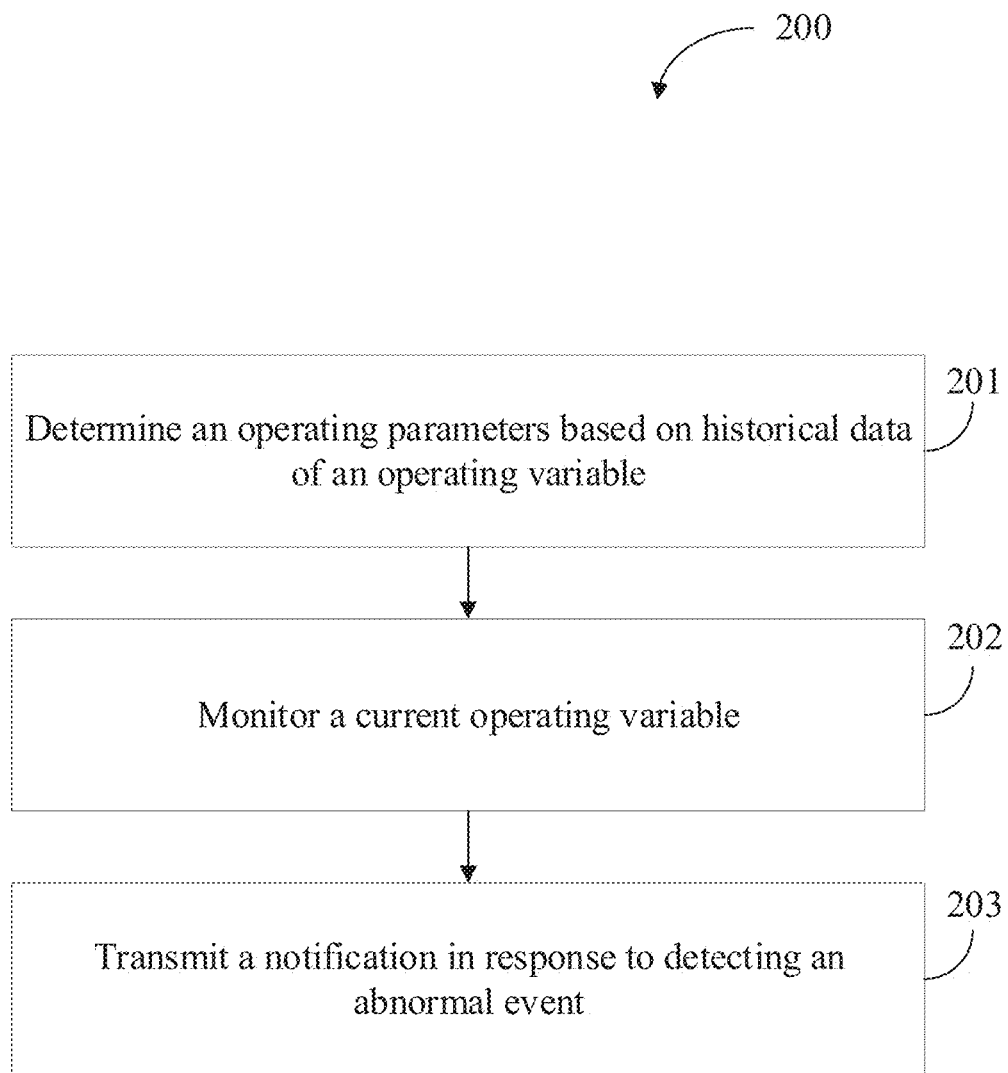
FIG. 2 depicts a flow diagram of a method of operating a temperature control device with an illustrative embodiment.

Referring now to FIG. 2, a flow diagram of a exemplary method 200 of operating a temperature control system is depicted with an illustrative embodiment. In operation 201, an operating parameter is determined based on historical data of an operating variable of a particular device. For example, the operating parameter may include a peak temperature, a valley temperature, a time that the temperature is above an upper threshold (e.g., upper time limit), a time that the temperature is below a lower threshold (e.g., lower time limit), or other parameters that can be monitored by a temperature control system. In some exemplary embodiments, the historical data of the operating variable is stored within a memory and accessed in order to determine the operating parameter. In some exemplary embodiments, the historical data used to determine the operating parameter includes historical data of the operating variable (e.g., temperature) for a first time period (e.g., the most recent week, 2 weeks, 3 weeks, 4 months, etc.). In some exemplary embodiments, the operating variable is collected over time (e.g., stored in memory after monitoring or detecting the operating variable at different times) in order to continuously add to the historical data of the operating variable (e.g., temperature). In this way, the temperature control system is able to determine the operating parameter with recent historical data, which allows for the temperature control system to learn or be smart in monitoring the operations of the system. In some embodiments, the operating parameter may be determined via one or more functions, operations, or statistical analysis, exemplary embodiments of which are included herein. One exemplary method of determining an operating parameter based on historical data of one or more operating variables is described with respect to FIG. 3.

In an operation 202, a current operating variable is monitored. In some exemplary embodiments, the temperature control system monitors the current temperature (e.g., current operating variable) within a container, the current amount of time that the temperature has been above an upper threshold, the current amount of time that the temperature has been below a lower threshold, or any other current variables that the temperature control system is able to detect.

In an operation 203, a notification is transmitted in response to determining an abnormal event. For example, the temperature control system may determine that an abnormal event is occurring or has occurred when one or more of the current operating variables violates or is inconsistent with the operating parameter. In some exemplary embodiments, an abnormal event is determined when a current amount of time that a temperature within a container is greater than a threshold exceeds an amount of time that was determined to be an operating parameter. Thus, it is understood that violation of an operating parameter means that a measured variable meets or exceeds a maximum threshold, or meets or falls below a minimum threshold.

Figure 3:
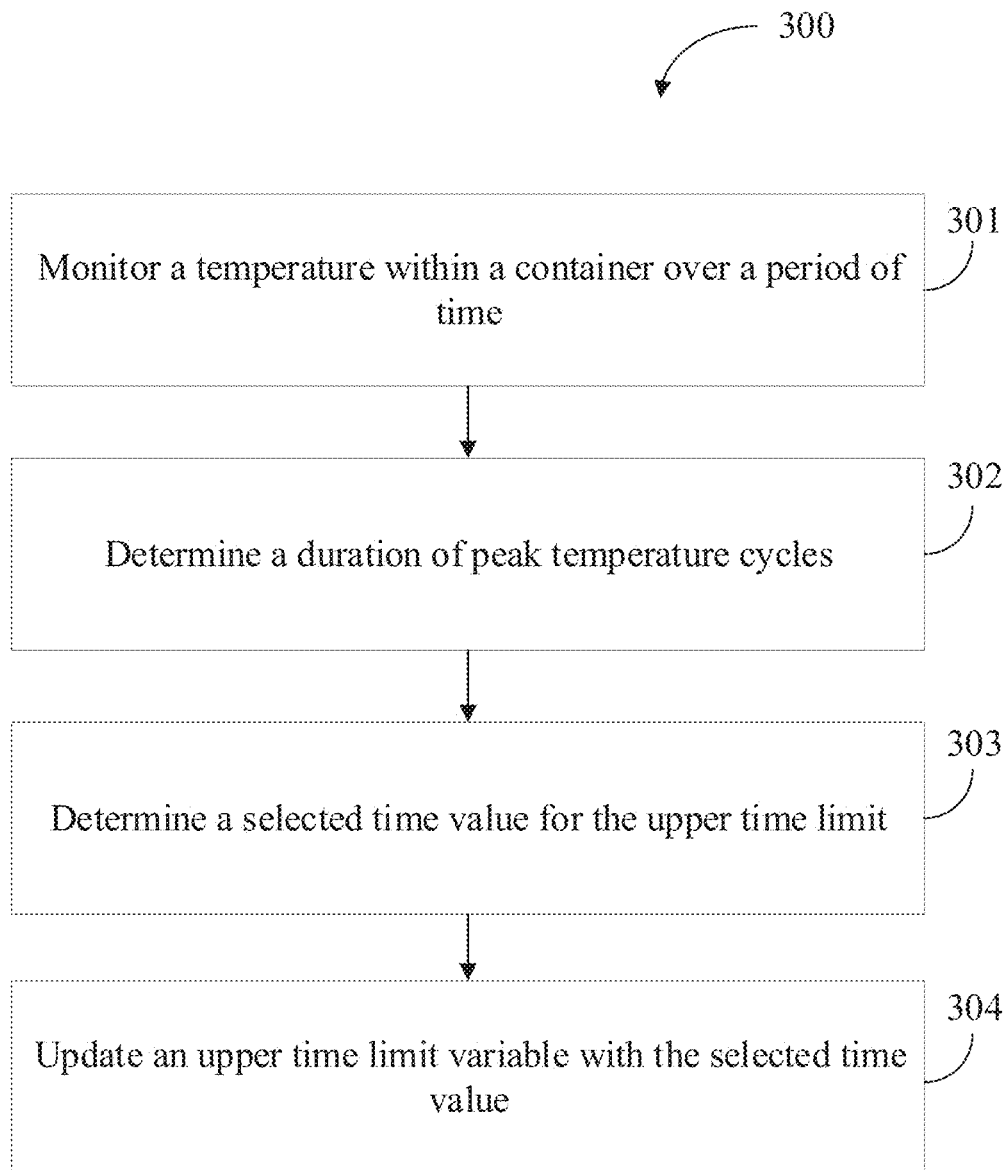
FIG. 3 depicts a flow diagram of a method of determining an operating parameter based on historical data of an operating variable with an illustrative embodiment.

Referring now to FIG. 3, which illustrates a flow diagram of an exemplary method 300 of determining an operating parameter based on historical data of an operating variable is depicted with an illustrative embodiment. In some exemplary embodiments, the operating parameter include an upper time limit and/or a lower time limit. The upper time limit is the maximum duration (e.g., a threshold value) that a peak temperature cycle may exhibit before an abnormal event is determined to have occurred. In an exemplary embodiment, the peak temperature cycle is the amount of time that a temperature within a particular temperature control device spends above an upper temperature limit before falling back below the upper temperature limit. The upper temperature limit is a value that may be set or changed by a user or the manufacturer based on the particular application and design of a smart temperature control system. It is to be appreciated that although FIG. 3 is discussed with respect to determining the upper time limit, similar techniques may also be used to determine the lower time limit, as will become apparent herein. Moreover, it is to be appreciated that similar techniques may be used with other operating parameters.

In certain exemplary embodiments, the lower time limit is the maximum duration (e.g., a threshold value) that a valley temperature cycle may exhibit before an abnormal event is determined to have occurred. The valley temperature cycle is the amount of time that a temperature of the particular temperature control device spends below a lower temperature limit before returning back above the lower temperature limit. The lower temperature limit is a value that may be set or changed by a user or the manufacturer based on the particular application and design of the smart temperature control system. In some embodiments, the upper and lower temperature limits define a range of desired operating temperatures for a particular temperature control device.

In operation 301, a temperature within a container 111 of a temperature control device 101 is monitored over a period of time. For example, processing circuitry 102 may be communicably coupled to one or more temperature sensors that are positioned to sense, detect, or monitor the temperature within the container 111. In some exemplary embodiments, the temperature may be continuously monitored. In other exemplary embodiments, the temperature may be measured or monitored at discrete intervals (e.g., 15 seconds, 30 seconds, minute, 2 minutes, 10 minutes, etc.) and stored within a memory in order to create historical data of the operating variable (e.g., temperature). In some exemplary embodiments, the temperature is monitored over a first period of time in order to create historical data of the operating variable (e.g., temperature) for the particular temperature control device 101.

In operation 302, a duration of peak temperature cycles in the historical data are determined. In some exemplary embodiments, the duration of each peak temperature cycle is determined and stored each time that the temperature of the container rises above and falls below the upper temperature limit. For example, in some embodiments, a first time that is recorded when the temperature rises above the upper temperature limit is be subtracted from a second time that is recorded when the temperature falls below the upper temperature limit in order to determine the duration of a peak temperature cycle. In some exemplary embodiments, raw data representing the temperature within the container 111 may be stored within memory and the duration of each peak temperature cycle over a time period may be calculated or determined at particular, discrete times determined or programmed into the processing circuitry 102. In some exemplary embodiments, the duration of each of the peak temperature cycles may be calculated, determined, or derived by the processing circuitry 102 based on detected peak temperatures during each cycle. Additional discussion of determining a duration of peak temperature cycles (and valley temperature cycles) are described below in reference to FIG. 3. Additionally or alternatively, the durations of valley temperature cycles may be determined. The valley temperature cycles include the portion of the temperature cycle in which the temperature in the container is below a temperature limit and may indicate an amount of time that the temperature in the container fell below the lower temperature limit. Additional discussion of determining a duration of peak temperature cycles (and valley temperature cycles) are described below in reference to FIG. 5.

In operation 303, a selected time value for the upper time limit is determined. In some exemplary embodiments, the selected time is the determined normal amount of time that should be assigned to the upper time limit based on historical data. In this way, the upper time limit (e.g., the operating parameter) may be determined or updated using the selected time limit value. For example, the selected time value may be calculated, determined, or derived for a particular temperature control device based on the historical durations of each peak temperature cycle determined in operation 302. In some exemplary embodiments, a maximum upper time limit may limit the selected time value. In some exemplary embodiments, selected time value includes to a buffer time value, for example, if the historical data does not include a particular amount of data needed. Additional discussion of determining a selected time value for the upper time limit are described below in reference to FIGS. 5-6. Additionally or alternatively, a selected time value may be similarly determined for the lower time limit based on the valley temperature cycles in operation 203.

In operation 304, the upper time limit is updated with the selected time value determined in operation 303. That is, upper time limit, which may be a variable within memory, is updated with the determined selected time value. In this way, the upper time limit (e.g., the operating parameter) may be determined or updated based on the historical data of the operating variables (e.g., temperature at different times) of the temperature control system.

Referring now to FIGS. 2 and 3, and in particular to operation 203, a notification or alarm is triggered in response to the system detecting an abnormal event. In some exemplary embodiments, the abnormal event may include current operating variables of the system violating or exceeding the operating parameter (e.g., the upper time limit). For example, if a temperature in the container 111 rises above the upper temperature limit for a period of time exceeding the upper time limit, the smart temperature control system 100 will attempt to notify a user in operation 203. In some exemplary embodiments, the smart temperature control system 100 will attempt to notify a user by generating and transmitting a notification (e.g., a text message) to a device associated with the user. In some exemplary embodiments, the smart temperature control system 100 will attempt to notify the user by triggering an alarm. In this way, the upper or lower time limit may be dynamically determined in order to ensure that the particular smart temperature control system 100 is operating properly in accordance with past performance without falsely alarming a user.

Figure 4:
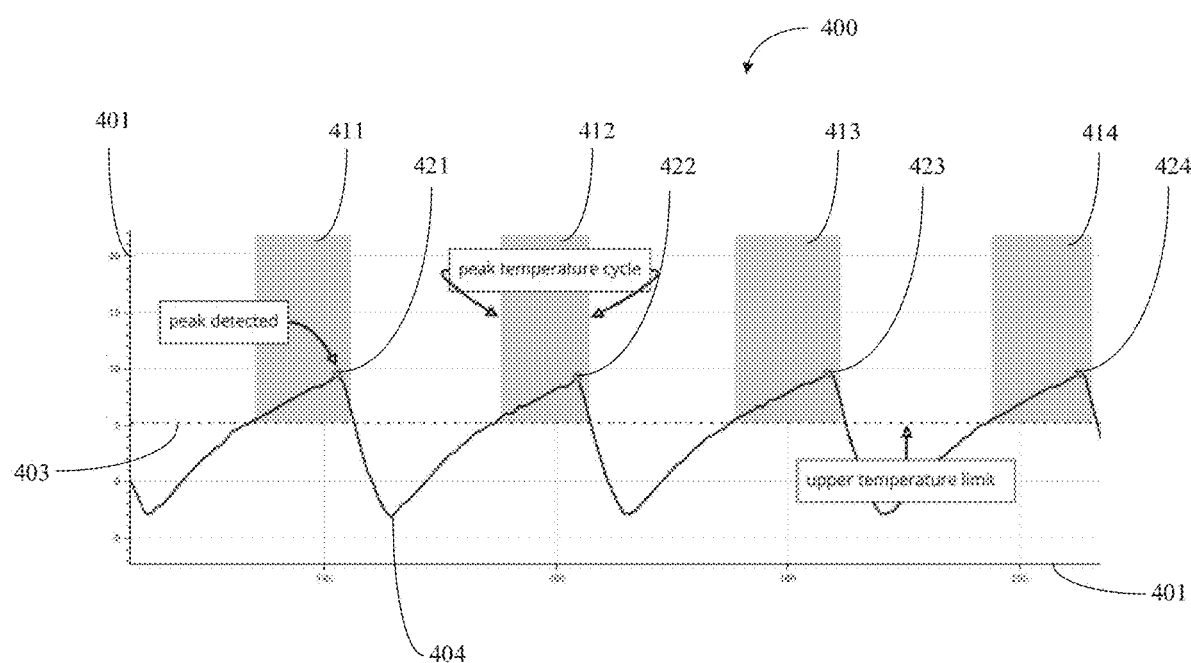
FIG. 4 is a graph of temperature cycle learning in accordance with an illustrative embodiment.

Referring now to FIG. 4, a graph 400 of temperature cycle learning is shown in accordance with an exemplary embodiment. For example, the disclosure of FIG. 4 may be one example of determining a duration of peak temperature cycles as explained in operation 302. In particular, the graph 400 represents the temperature over time of a particular smart temperature control system 100. The graph 400 includes a y-axis representing temperature 401 and an x-axis representing time 402. The graph 400 also includes a signal profile 404 representing the temperature measured within the container 111 at particular times (e.g., historical data of the temperature). The signal profile 404 may be cyclical due to normal defrost cycles, abnormal instances (e.g., such as a door being accidentally left open), failure of the temperature control hardware, or an overloading of product within the container 111. By way of example, the amount of product or the residual temperature of product placed into the container 111 may interfere with the temperature control system's 100 ability to regulate the temperature within the container 111. In an exemplary embodiment, the temperature within the container may be measured, detected, and monitored by the processing circuitry 101 via a connection to one or more temperature sensors positioned to monitor the temperature 401 in the container 111.

The graph 400 also includes an upper temperature limit 403. The upper temperature limit 403 is the maximum temperature the container 111 may be for a period of time. The upper temperature limit 403 may be set or changed by a user or a manufacturer based on the particular application and design of the smart temperature control system 100. The graph 400 includes historical data of the temperature over a 24-hour period. However, it is to be appreciated that in other exemplary embodiments, historical data over a longer or shorter range may be utilized.

The graph 400 also includes a first peak temperature cycle 411, a second peak temperature cycle 412, a third peak temperature cycle 413, and a fourth peak temperature cycle 414. The peak temperature cycles 411, 412, 413, and 414 represent the amount of time that the temperature within the container has spent above the upper temperature limit 403. The graph 400 also includes a first, second, third, and fourth peak temperature 421, 422, 423, and 424 detected for each of the peak temperature cycles 411, 412, 413, and 414, respectively.

In some exemplary embodiments, the peak temperatures 421, 422, 423, and 424 are detected by the processing circuitry 102 and the peak temperature cycles 411, 412, 413, and 414 are derived. In this way, by detecting the peak temperatures 421, 422, 423, and 424 the processing circuitry 102 learns the statistically normal time that the temperature of the container 111 spends above the upper temperature limit 403 based on the durations of each cycle. The processing circuitry 102 detects the peak temperatures 421, 422, 423, and 424 and may store or otherwise document the maximum temperature the container ordinarily reaches during peak temperature cycles, the number of peak temperature cycles that usually occur during certain time periods, and the normal or average amount of time between the peak temperature cycles for the particular container 111.

Figure 5:
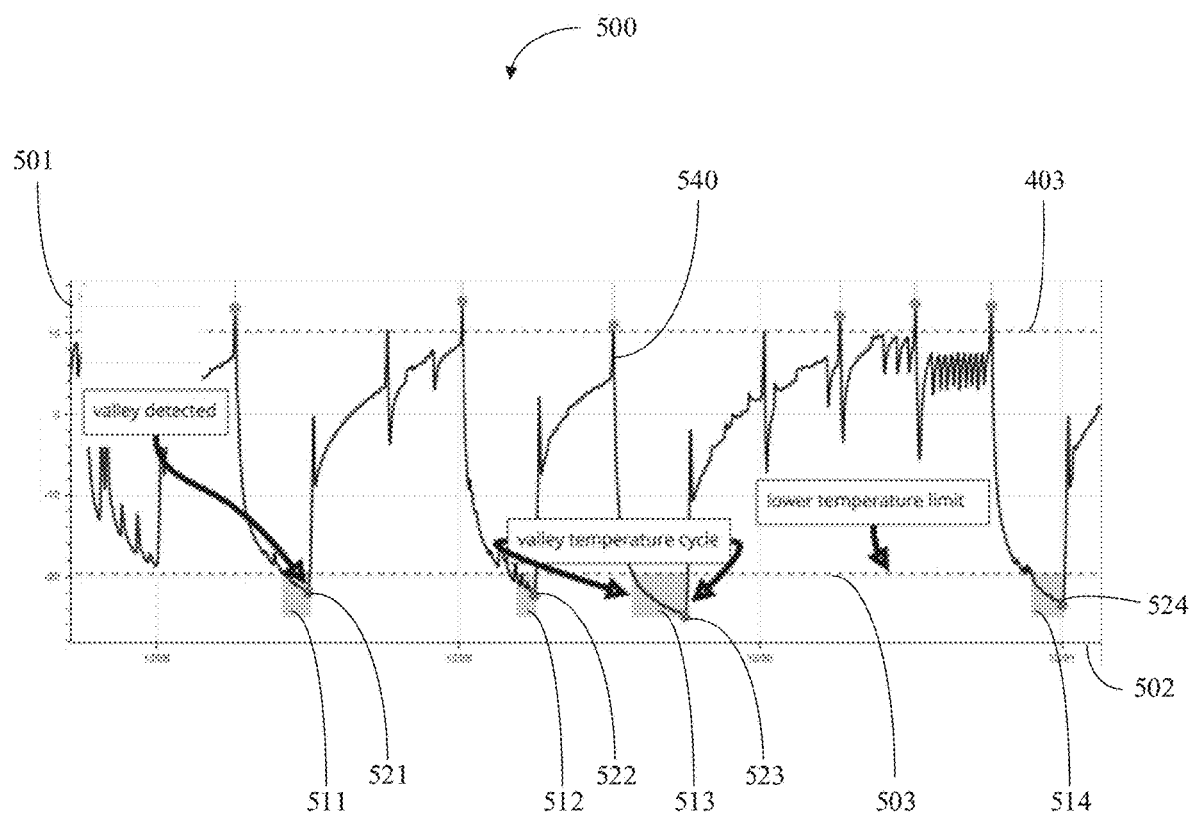
FIG. 5 is a graph of temperature cycle learning in accordance with an illustrative embodiment.

FIG. 5 is a graph 500 of temperature cycle learning in accordance with an exemplary embodiment. For example, the discussion of FIG. 5 may be one example of determining a duration of low temperature "valley temperature" cycles as indicated with respect to operation 302. Similar to graph 400 of FIG. 4, graph 500 is a representation of temperature versus time. The graph 500 includes a y-axis representing temperature 501 and an x-axis representing time 502. The graph 400 includes an upper temperature limit 403 and a lower temperature limit 503. The lower temperature limit 503 is the minimum temperature that a cooler may be for a period of time. The upper temperature limit 403 and the lower temperature 503 may define a range of preferred operating temperatures for a particular temperature control device 101. In some exemplary embodiments, the lower temperature limit 503 may be set or changed by a user or by a manufacturer for each smart temperature control system 100. The graph 500 also includes a signal profile 540 representing the temperature within the container 111 at particular times.

The graph 500 also depicts a first, second, third, and fourth minimum valley temperature 521, 522, 523, and 524 and respective first, second, third and fourth valley temperature cycles 511, 512, 513, and 514. The first, second, third and fourth valley temperature cycles 511, 512, 513, and 514 represent the amount of time that the container has been below the lower temperature limit 503. The processing circuitry 102 may detect the minimum valley temperatures 521, 522, 523, and 524 and determine or derive the first, second, third and fourth valley temperature cycles 511, 512, 513, and 514. In certain exemplary embodiments, the processing circuitry 102 stores or otherwise documents the minimum temperature the container ordinarily reaches during valley temperature cycles, the number of valley temperature cycles that usually occur during certain time periods, and the normal or average amount of time between the valley temperature cycles for the particular container 111.

Figure 6:
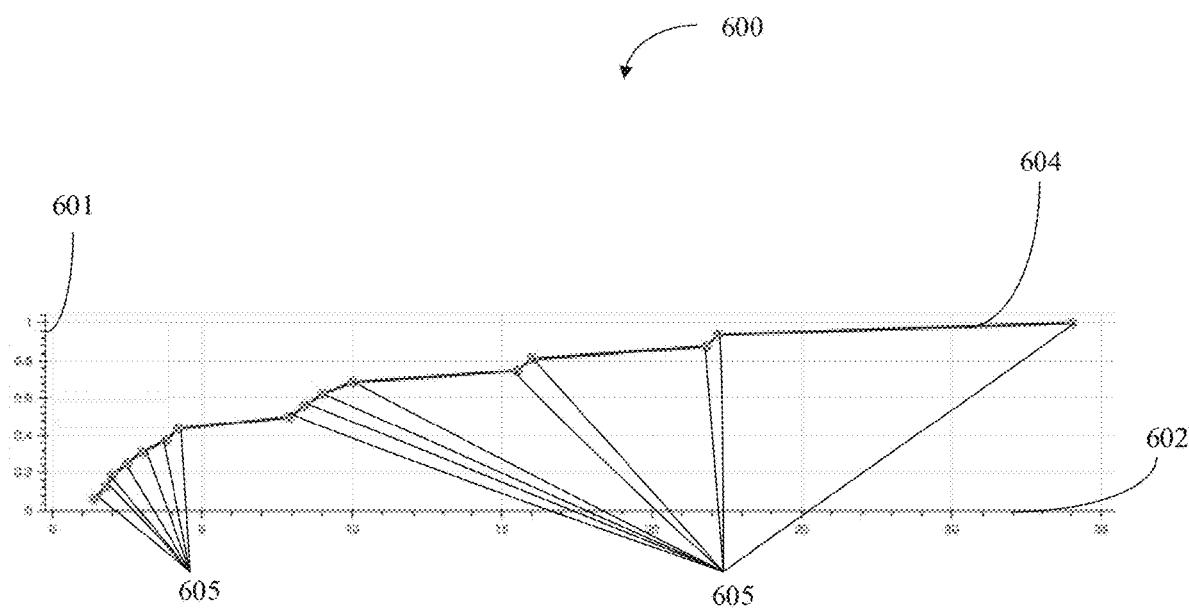
FIG. 6 is a graph of time limit selection in accordance with an illustrative embodiment.

FIG. 6 is a graph 600 of time limit selection in accordance with an illustrative embodiment. The graph 600 represents an empirical cumulative distribution function (ECDF) 604 for durations of the peak temperature cycles 605 (e.g., peak temperature cycles 411, 412, 413, and 414). In certain exemplary embodiments, the graph 600, portions thereof, or equivalents may be used to determine an upper time limit. The graph 600 includes a y-axis that represents probability 601 and a y-axis that represents a duration 602 of the peak temperature cycles. In exemplary embodiments the ECDF 604 allows for an estimate of the probability of a temperature control device 101 behaving in particular ways based on historical data.

In some exemplary embodiments, the processing circuitry 102, after calculating, determining, or measuring the duration of each of the peak temperature cycles creates, generates, or determines the ECDF 604. The ECDF 604 may them be used to estimate the probability of a peak temperature cycle of a temperature control device lasting a specific duration or less based on historical data. In certain exemplary embodiments, the cumulative probability of the durations of the peak temperature cycles is used to determine a selected time value that is appropriate for an upper time limit. For example, a selected time value for the upper time limit may be determined or selected to be the time that correlates to a cumulative probability is at a particular threshold (e.g., 0.7, 0.75, 0.8, 0.85, 1, etc.).

In certain exemplary embodiments, other operations, processes, or methods may be performed with the historical data (e.g., the durations of the peak temperature cycles over a period of time) in order to determine the appropriate value of the upper time limit. For example, in some exemplary embodiments, the historical data may include outliers or particular durations of a temperature cycle that were due to incidences or abnormalities. In certain exemplary embodiments, these abnormalities could influence the calculated limit values in such a way as to render the limit values less likely to reflect correct control limit values. Thus, to arrive at correct calculations, abnormal values should not be used in the determination of appropriate limit values. In such examples, the historical data may include abnormalities or instances that should not be included in the determination of the appropriate value for the upper time limit. For example, FIG. 7 depicts a graph 600 that may be used to filter out data from the historical data that should not be used in the determination of an appropriate value for the upper or lower time limit.

Figure 7:
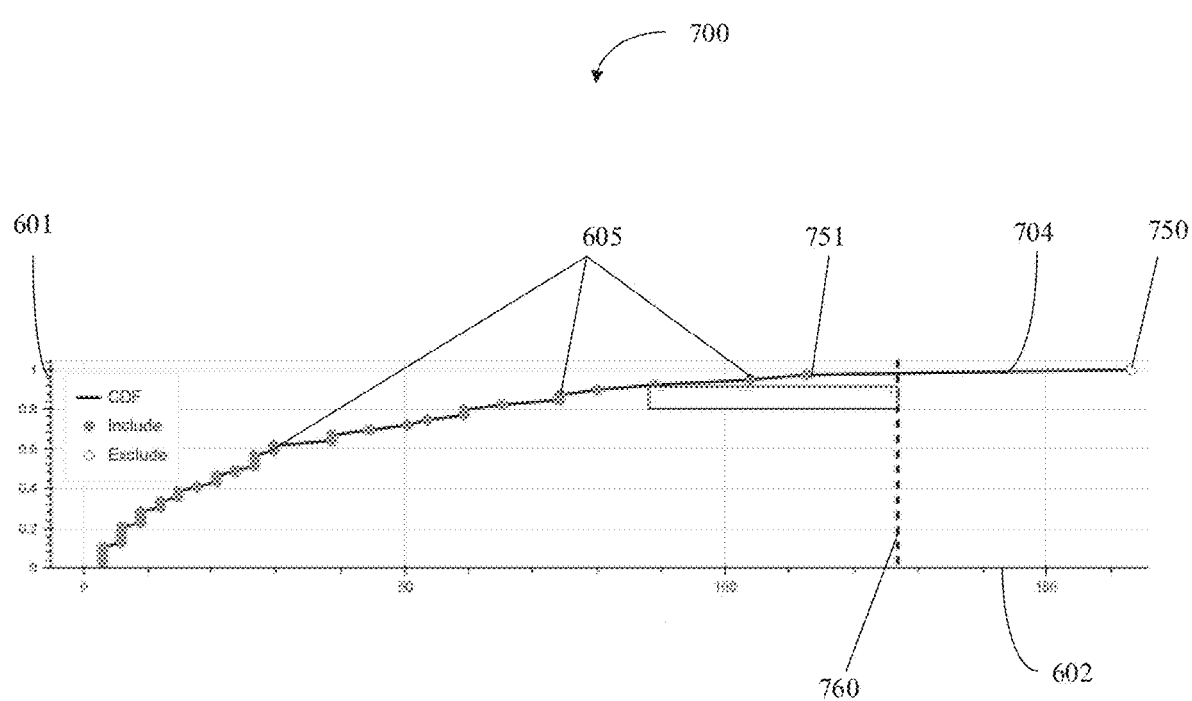
FIG. 7 is a graph of time limit selection in accordance with an illustrative embodiment.

FIG. 7 depicts the graph 700 for time limit selection in accordance with an exemplary embodiment. The graph 700 is similar to the graph 600 as explained in reference to FIG. 6. The graph 700 represents an empirical cumulative distribution function (ECDF) 704 for durations of the peak temperature cycles 705 (e.g., peak temperature cycles 411, 412, 413, and 414). The graph 700 includes at least one peak temperature cycle 750 that is an outlier or abnormal. In some exemplary embodiments, more than one peak temperature cycle 750 may be abnormal. The outlier or abnormal peak temperature cycle 750 may be determined and eliminated, not used, or reduced in importance in the determination of the selected time value of the upper time limit via one or more processes. For example, the outlier or abnormal peak temperature cycle 750 may be reduced in importance in the determination of the selected time value of the upper time limit by using a mean absolute deviation (MAD) to determine the outliers (e.g., peak temperature 750) and eliminate them from determining an appropriate control value. For example, MAD was used in FIG. 7 to determine that the abnormal peak temperature cycle 750 should not be used in the determination of an appropriate control value. Thus, in some exemplary embodiments, an appropriate value may be the time that corresponds to the probability of a highest non-abnormal peak temperature cycle 751. In some exemplary embodiments, MAD may be used because of the tolerance of MAD in various sample sizes and distribution (e.g., each temperature control device has been determined to have a different distribution of temperature cycles). In certain other exemplary embodiments, other filtering processes or techniques may be implemented as appropriate.

In some exemplary embodiments, the selected time value includes a time buffer. For example, a time buffer may be added to the time corresponding to the highest non-abnormal peak temperature cycle 751 in order to determine the selected time value. The graph 700 includes a line 760 that represents a selected time value for the upper time limit. In some exemplary embodiments, the selected time value is determined by taking a first time value (e.g., the time that corresponds to the probability of a highest non-abnormal peak temperature cycle 751) and adding a determined time buffer. For example, in some embodiments, the time buffer may be determined based on the sample size of the observations (e.g., the number of cycles used to determine the ECDF). In some exemplary embodiments, when the sample size is below a first threshold (e.g., 3 or 4), the time buffer may be selected to be a large value (e.g., 30 minutes) to ensure that false alarms are not triggered. In some exemplary embodiments, when the sample size within a range (e.g., 3 or 4 to 10 or 12), the time buffer may be selected to be a different value (e.g., between the range of 10 minutes to 30 minutes). In some exemplary embodiments, when the sample size is large (e.g., above 12), the time buffer may be a smaller value (e.g., 0 to 10 minutes). In some exemplary embodiments, the time buffer may be selected in a manner that correlates (e.g., linearly or functionally) to the sample size. In some exemplary embodiments, a linear function, other function, or table of time buffers that correlates time buffers to the sample size may be stored in memory of the processing circuitry 102 and referenced in order to determine the time buffer.

In alternative embodiments, other methods of determining an upper time limit based on time buffers, specified ranges, and historical data of the temperature cycles may be used. It is to be appreciated that while FIGS. 6 and 7 are discussed for determining a selected time value for the upper time limit, similar techniques may be used to determine an ECDF for the valley temperature cycles and a selected time value for the lower time limit.

In some exemplary embodiments, the selected time value may be restricted between a maximum and minimum bound. The restriction may be used to ensure that the upper time limit and the lower time limit will always be between a minimum or maximum range to guard against unrealistic and unhelpful time sections. In some exemplary embodiments, a maximum boundary or limit may be based on the type of the temperature control device or the application of the temperature control device. For example, four hours may be all the time that foodstuffs may spend above an upper temperature limit before the food spoils. In such an example, the maximum boundary may be set to three hours to ensure that a user is notified well before the four-hour benchmark. In another example, a minimum boundary may be set to one hour or lower. In certain exemplary embodiments, the minimum boundary is adjusted based on the type of product being stored in the temperature control unit.

In some exemplary embodiments, as indicated with respect to operation 304, once the selected time value is determined (e.g., via processing circuitry 102) the selected time value may be set as the upper (and/or lower) time limit in a memory or other storage medium. The upper time limit may then be used via a comparison to the amount of time that a temperature of the temperature control device 101 spends above the upper temperature limit and automatically notify a user if the amount of time exceeds an upper limit of time. Similarly, the lower time limit may be used via a comparison to the amount of time that a temperature of the temperature control device 101 spends below the lower temperature limit and automatically notify a user if the amount of time exceeds an upper limit of time as indicated in operation 203. In some embodiments, the processing circuitry 102 may determine that a peak (or value) temperature of the temperature control device 101 is has reached a level too high (or too low) and that the temperature control device 101 will not be able to recover to an acceptable temperature (e.g., within the temperature ranges of the upper and lower temperature limits) in a time that would be less than the upper (or lower) temperature limit and notify the user. For example, the processing circuitry 102 may store (e.g., have stored within memory) the known slope of the cooling or heating rates of a particular temperature control device 101 in order to calculate, determine, or derive the amount of time that the particular temperature control device 101 needs (or will need) in order reach the acceptable temperature based on a detected or measured temperature of the temperature control device 101.

In some exemplary embodiments, the smart temperature control system 100 may be used with an existing temperature control devices 101. Additionally, the smart temperature control system 100 may have selectable "on" or "off" modes that may be enabled or disabled by a manufacturer or a user in order to use the learning capabilities of smart temperature control system 100 or not use the learning capabilities of the smart temperature control system 100

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method of operating a temperature control system, the method comprising:
    determining, via processing circuitry of the temperature control system, an operating parameter of a temperature control device based on historical data of an operating variable, the operating parameter comprising an upper time limit variable, the historical data of the operating variable comprising historical data of a temperature, and a current operating variable comprising a current temperature within a container, the operating parameter determined by:
        accessing the historical data of the temperature;
        determining a duration of a peak temperature cycle within the historical data of the temperature;
        determining a selected time value based on the duration of the peak temperature cycle; and
        updating an upper time limit variable with the selected time value;
    monitoring, via the processing circuitry, a current operating variable of the temperature control system; and
    transmitting, via the processing circuitry, a notification in response to detecting an abnormal event based on the current operating variable and the operating parameters.

2. The method of claim 1, wherein the historical data of the operating variable comprises a temperature within the container at particular times over a first period of time, wherein the historical data of the operating variable indicates one or more peak temperature cycles, wherein each peak temperature cycle comprises a period of time between a first time and a second time, and wherein the first time represents the temperature of the control device exceeding an upper temperature limit and the second time represents the temperature of the control device falling below the upper temperature limit.

3. The method of claim 1, wherein the operating parameter comprises an upper time limit variable that indicates a maximum amount of time that the temperature of the container may exceed an upper temperature limit before the processing circuitry notifies a user.

4. The method of claim 1, wherein the upper time limit variable is a maximum amount of time that the temperature of the container may exceed an upper temperature limit before the abnormal event is detected.

5. The method of claim 1, wherein the upper time limit variable is determined based on the historical data of the operating variable.

\* \* \* \* \*